Jan. 7, 1964 S. F. KRUMHEUER 3,116,715
FEED CONVEYORS FOR BUNK FEEDERS
Filed Jan. 27, 1961 2 Sheets-Sheet 2
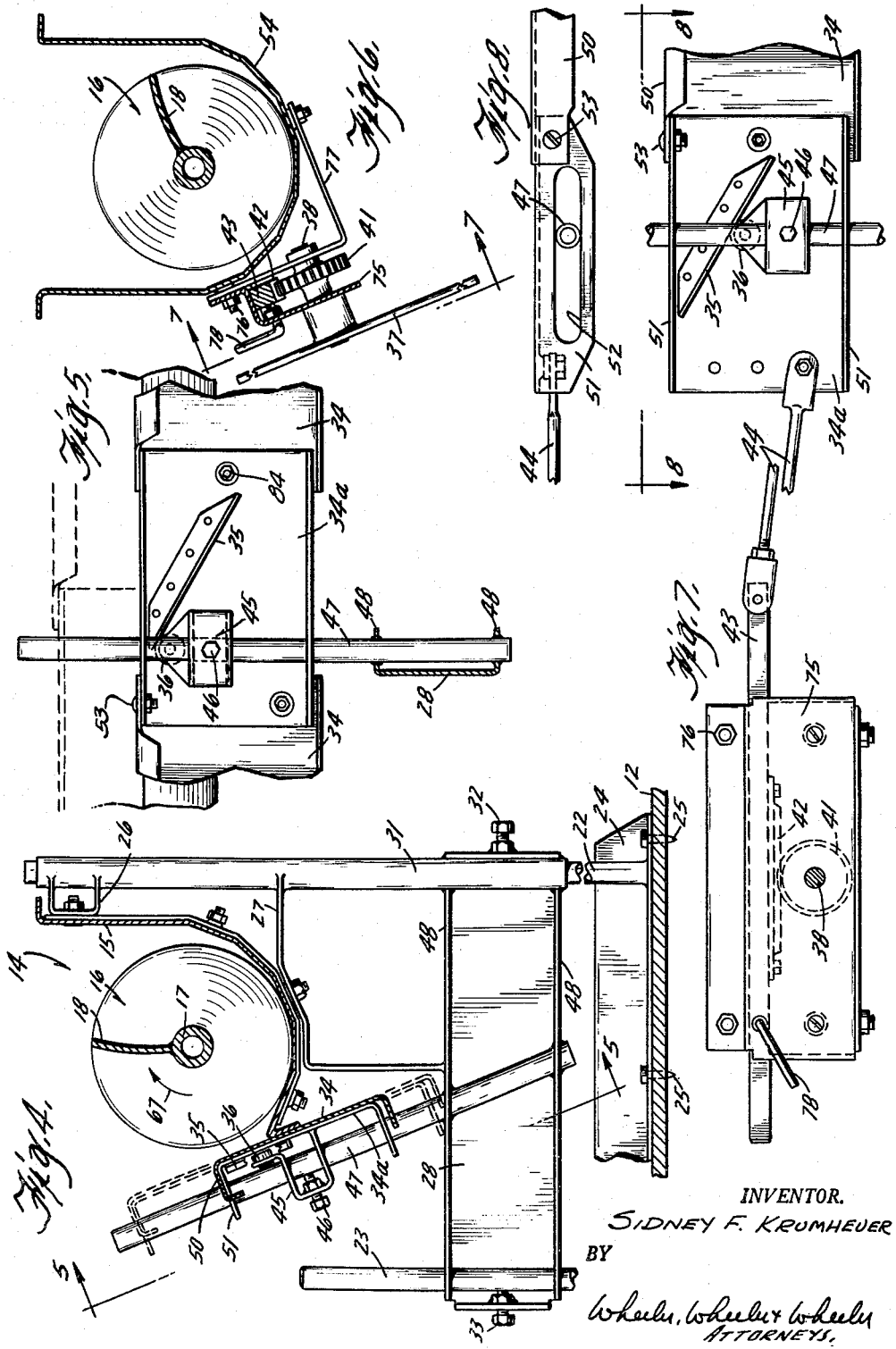
INVENTOR.
SIDNEY F. KRUMHEUER
BY
Wheeler, Wheeler & Wheeler
ATTORNEYS.

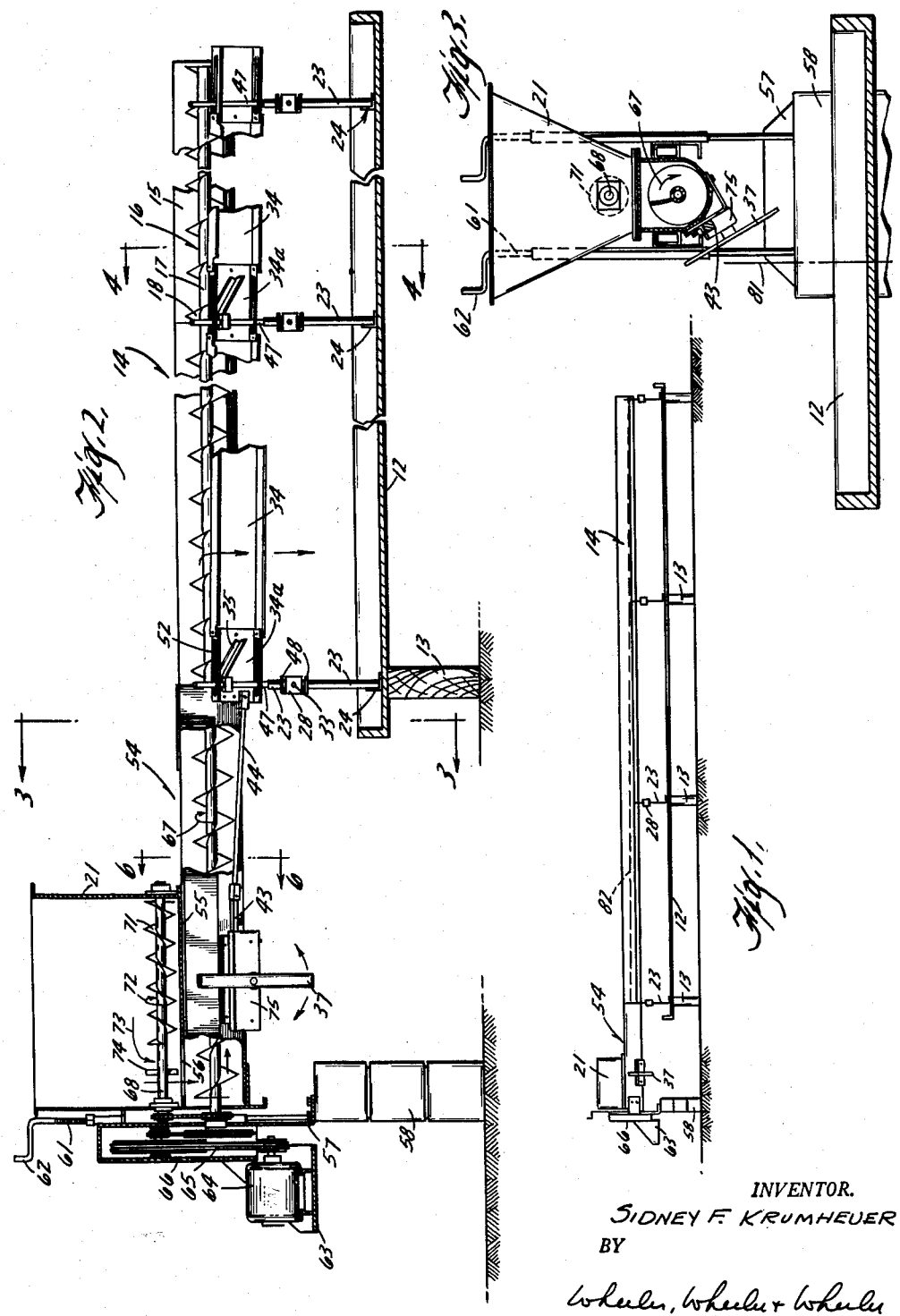

United States Patent Office 3,116,715
Patented Jan. 7, 1964

3,116,715
FEED CONVEYORS FOR BUNK FEEDERS
Sidney F. Krumheuer, Fort Atkinson, Wis., assignor to Rockwood & Co., Chicago, Ill., a corporation of Delaware
Filed Jan. 27, 1961, Ser. No. 85,264
12 Claims. (Cl. 119—52)

This invention relates to an improvement in feed conveyors.

The feed conveyor of the present invention, as exemplified herein as a cattle feeder, is characterized by its ability to rapidly convey large quantities of feed of various types without clogging and to discharge such feed in substantially uniform quantities throughout its length.

The described embodiment of the invention comprises a generally open top conveyor trough in which a feed auger is disposed. The trough has a laterally open side partially closed by a gate over the top edge of which conveyed material is discharged laterally by the auger. The gate is desirably inclined laterally in the direction of material discharge and is adjustable in height to change the discharge capacity and characteristics of the conveyor.

The conveyor of the present invention will handle most of the conventional cattle feeds. It is particularly adapted to handle the crumbly types of silage and ground feeds such as corn silage, grass silage of either high or low moisture content, whole or cracked grains such as corn, etc.

Other objects, advantages and features of the invention will appear from the following disclosure in which:

FIG. 1 is a small scale side elevation of a cattle feeder embodying the present invention.

FIG. 2 is a greatly enlarged fragmentary side elevation of the feeder of FIG. 1, housing portions being broken away and shown in cross section to expose details of construction.

FIG. 3 is a cross section taken along the line 3—3 of FIG. 2.

FIG. 4 is a cross section taken on the line 4—4 of FIG. 2.

FIG. 5 is a cross section taken along the line 5—5 of FIG. 4.

FIG. 6 is a cross section taken along the line 6—6 of FIG. 2.

FIG. 7 is a cross section taken along the line 7—7 of FIG. 6.

FIG. 8 is a view taken along the line 8—8 of FIG. 7.

The invention will be exemplified herein in connection with supplying cattle feed to a bunk type feeding trough or shelf 12 elevated above ground level on supports 13 at a convenient height from which cattle or other animals can feed.

Above the bunk 12 is a feed conveyor 14 which comprises for the major portion of its length an open top feed trough 15 and an auger 16. As best shown in FIG. 4, trough 15 is laterally open at one side and is J-shaped in cross section. The auger consists of an axle shaft 17 having a helical flight 18 wound thereon. The auger desirably simply rests by gravity on the bottom of the trough 15. This assures good conveyor action with respect to feed at the bottom of the trough. Moreover, only gravity opposes upward yielding of the auger to pass clods of silage which might otherwise clog the auger. The auger axle shaft 17 is accordingly unprovided with any bearing support, except at transmission housing 66.

Trough 15 is supported on bunk 12 on posts 22, 23, the bottom ends of which may be fastened to angular cross beams 24 suitably attached as by lag screws 25 to the floor of bunk 12 (FIG. 4).

Laterally open trough 15 is fastened by brackets 26, 27, 28 to a hollow tube 31 which is telescopic on post 22, the relative positions of post 22 and tube 31 being adjustably fixed by the set screw 32. The end of bracket 28 opposite tube 31 is slidable on post 23 and is adjustably fixed thereto by the set screw 33. Accordingly, the level of the trough 15 with respect to the bunk 12 can be conveniently adjusted.

The otherwise laterally open side wall of trough 15 is provided with a gate 34 which is adjustable vertically with respect to the level of the auger 16. Gate 34 functions as a side wall of adjustable height. Its range of movement for the set screw 46 setting shown therein is indicated in full and broken lines in FIG. 4. Adjustment of the gate 34 through its various positions will adapt the conveyor to handle different types of animal feed.

Adjustable gate 34 is desirably made in sections, each about ten feet long, and connected together in longitudinal series by coupler sections 34a. The coupler sections 34a and the gate sections 34 have complementary flanges 51, 50 interconnected by bolts 53. Coupler sections 34a are provided with inclined cam tracks 35 on which the gate 34 is raised or lowered on cam rollers 36 when the gate 34 is shifted longitudinally by manipulation of the hand crank 37.

Crank 37 has a shaft 38 (FIGS. 6 and 7) to which a pinion 41 is fastened. Pinion 41 meshes with a rack 42 on a slide bar 43 pivotally connected by pitman 44 to the first gate coupler section 34a. The crank 37, pinion 41, rack 42 and slide bar 43 are mounted as best shown in FIGS. 6 and 7 in housing frame 75 attached by bolts 76 to a bracket 77 mounted on the U-shaped trough section 54. Slide bar 43 can be locked in any position by friction bolt 77 which has a crank handle 78. Accordingly, the gate 34 can be locked in any position of adjustment.

On manual turning of the handle 37, pinion 41 will rotate to impart rectilinear movement to the slide bar 43. Such motion is communicated through the pitman 44 to shift the gate 34 longitudinally of the conveyor trough 15 and to selectively raise or lower it by reason of the interaction of the cam tracks 35 with the cam rollers 36.

Cam rollers 36 are respectively mounted on brackets 45 which are adjustably fixed by set screws 46 on the inclined gate guide posts 47. As best shown in FIG. 4, the posts 47 extend through suitable openings formed in the upper and lower flanges 48 of the cross bracket 28 and are welded thereto.

As best shown in FIG. 8, the gate coupler sections 34a have upper and lower flanges 51 with longitudinal slots 52 through which the posts 47 extend to guide the gate 34 in its longitudinal movement.

The number of gate sections 34 will depend on the overall length of the conveyor. In practice the trough sections 15 have a standard ten foot length and there are as many gate sections 34, coupler sections 34a and sets of posts 22, 23 as there are sections of trough.

At its input end, the trough 14 is connected to a U-shaped trough section 54 (see FIG. 6) which has fixed side walls and a cover plate or baffle 55 with an opening 56 between the trough section 54 and hopper 21 and through which feed in the hopper 21 flows into trough section 54. This end of the conveyor is supported on the stand 57 anchored to a suitable elevated footing 58. The height of trough 54 is adjusted by screw jacks 61 having manually operated crank arms 62. Stand 57 also supports a shelf 63 for an electric motor 64 which drives the auger 16 through a belt 65 and the various chain and drive sprocket elements disposed in the transmission housing 66.

The transmission mechanism within the housing 66 is otherwise conventional and serves to drive the auger 16 in the direction of arrow 67 in FIGS. 2 and 4. It also drives the shaft 68 for auxiliary auger 71 within hopper 21 in the direction of arrow 72 to cause feed within hopper 21 to move in the direction of arrow 73 toward the opening 56 into the trough 54. Shafts 68 may have a beater 74 mounted on it just above opening 56 to keep the opening clear of any feed which might otherwise tend to clog the opening.

As best shown in FIG. 3, conveyor trough 14 is positioned over the bunk 12 with its adjustable gate 34 approximately over the center line 81 of the bunk 12. Accordingly, material discharged by the conveyor 14 over the top edge of gate 34 will fall substantially on the center line of the bunk 12 for flow laterally therefrom to be readily accessible to cattle feeding from either or both sides of the bunk.

When the device is set up, the brackets 45 (FIGS. 4, 5 and 7) are desirably adjustably positioned on inclined posts 47 so that the top rim of the adjustable gate 34 will have a slight downward incline longitudinal from the U-shaped trough section 54 toward the end of the conveyor remote from the hopper 21, as is shown in broken line 82 in FIG. 1.

The auger 16 which rotates in the direction of arrow 67 will not only feed material longitudinally along the trough, but will discharge the material over the upper edge of the gate 34. The incline 82 is adjusted so that the material will be discharged from the trough substantially along its entire length. Corn pouring over the rim of the gate looks like a long waterfall.

Gate 34 will be adjusted vertically by manipulation of crank 37 according to the material to be conveyed therein. For example, finely cut silage or grain will be uniformly discharged from the conveyor trough most expeditiously if the gate 34 is in one of its lowermost positions. Relatively coarsely chopped silage which has considerably greater bulk per unit of weight and which tends to clog other feeders will be conveyed most effectively if the gate 34 is raised to one of its uppermost positions.

An important advantage of the invention is that the conveyor auger 16 can be operated at relatively high speed and will deliver large quantities of feed substantially uniformly along the trough in a very short space of time. Conveyors embodying the invention will require only two or three minutes of operation to discharge feed over the gate rim along the entire length of the trough, even where the trough is as long as one hundred feet or more. This is in marked contrast to other known feeders which require substantially greater periods of time to deliver feed in any quantity to the bunk.

Moreover, because the top of the trough of the conveyor is entirely open, the conveyor cannot become clogged in normal operation. Clots of silage, etc., can simply ride over the top of the auger. Because the auger flight below the auger axle 17 rotates toward the gate 34, such clots will tend to be thrown over the gate rim and into the bunk, all without clogging feeder operation.

The conveyor of the present invention is extremely versatile because of the number of adjustments which are provided to regulate the height of the conveyor trough above the level of the bunk 12, to change the longitudinal incline of the top rim of gate 34 and to adjust the range within which the gate is vertically adjustable. Manipulation of the crank 37 to shift the gate longitudinally of the feeder quickly changes its level with respect to the auger to change the discharge capacity and feeding characteristics of the conveyor. The change in level is accompanied by a change in the effective width of the trough. This is because of the incline of the guide posts 47 (desirably in the range of 20°–30° to the vertical).

Note from FIG. 5 that all gate coupler sections 34a, except the one shown in FIGS. 7 and 8 to which pitman 44 is connected, are pivotally connected on single bolts 84 to the following gate sections 34. Accordingly, the gate is free to articulate on the bolts 84 to accommodate for the settings of set screws 46 of the roller brackets 45 and to insure support for the gate at each bracket 45.

I claim:

1. A conveyor adapted to discharge conveyed material laterally therefrom and comprising a trough having a high side and a low side, said low side being substantially laterally open, an auger in the trough, said trough having a gate at its low side and over which said material is discharged on auger rotation, the low side of the trough being unobstructed above said gate for unimpeded discharge of material over the gate, and means on which the gate is adjustable to change the discharge capacity of the conveyor.

2. The conveyor of claim 1 in which said means comprises means to shift said gate longitudinally of the conveyor, and cam means responsive to such shifting to raise and lower the gate uniformly along its length.

3. The conveyor of claim 1 in which said gate is inclined laterally in the direction of material discharge, said means comprising means to shift the gate both laterally and vertically.

4. The conveyor of claim 1 in which said auger has an axle and a helical flight thereon, said auger resting by gravity on the trough.

5. The device of claim 1 in which said conveyor has an input end and a remote end, said gate having a top edge which slopes downwardly toward the said remote end for substantially uniform discharge of material over said edge from said input end to said remote end.

6. An animal feeder comprising a bunk, a feed conveyor over the bunk for discharge of feed into the bunk where it will be accessible to animals feeding therefrom, said conveyor comprising a trough having a high side and a low side, said low side being substantially laterally open and substantially vertically aligned with the center line of the bunk, an auger in the trough, said trough having a gate at its low side and over which feed is discharged on auger rotation, and means on which the gate is adjustable to change the discharge capacity of the conveyor.

7. An animal feeder comprising a bunk, a feed conveyor over the bunk for discharge of feed into the bunk where it will be accessible to animals feeding therefrom, said conveyor comprising a trough having a high side and a low side, said low side being substantially laterally open, an auger in the trough, said trough having a gate at its low side and over which feed is discharged on auger rotation, and means on which the gate is adjustable to change the discharge capacity of the conveyor, said means comprising gate guide supports, said supports and gate having complementary coacting cam means, and means for shifting said gate longitudinally of the conveyor for selectively raising and lowering said gate on said coacting cam means.

8. The animal feeder of claim 7 in which the cam means on said supports are adjustable vertically to preset the range within which the gate will raise and lower pursuant to shifting it longitudinally.

9. The animal feeder of claim 8 in which said trough has a relatively fixed side opposite its open side, said gate guide supports diverging upwardly with respect to said fixed side whereby the trough will be enlarged both laterally and upwardly when the gate is raised.

10. A conveyor adapted to discharge conveyed material laterally therefrom and comprising a trough having one side laterally open, an auger in the trough, said trough having a gate at its otherwise open side and over which said material is discharged on auger rotation, and means on which the gate is adjustable to change the discharge capacity of the conveyor, said trough having a fixed side and a bottom joined in J-configuration, said gate comprising an elongated plate on the opposite side of the trough bottom from the fixed trough side, said plate comprising sections interconnected by coupler sections, gate supports adjacent said coupler sections, said means comprising cam means respectively on said gate supports and coupler sections and means to shift the gate longitudinally of the conveyor to raise and lower the gate on said cam means.

11. The conveyor of claim 10 in which said plate diverges upwardly from the fixed trough side whereby the trough will be enlarged both laterally and upwardly when the gate is raised.

12. The conveyor of claim 10 in which at least some of said plate sections are pivotally connected to coupler sections adjacent thereto whereby said gate may articulate about said pivotal connections.

References Cited in the file of this patent

UNITED STATES PATENTS

| | | |
|---|---|---|
| 302,501 | Kruse | July 22, 1884 |
| 2,793,615 | Kerkvliet | May 28, 1957 |
| 3,028,838 | Haggard et al. | Apr. 10, 1962 |